Nov. 9, 1965  R. LOHR  3,216,528
SPRING MOTOR DRIVE
Filed Dec. 23, 1963  2 Sheets-Sheet 1
FIG. 1.
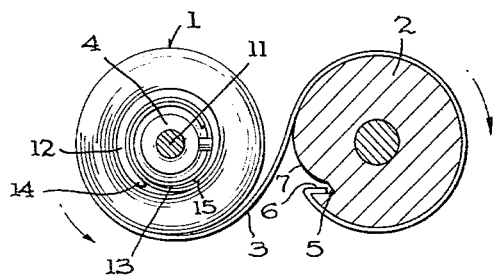
FIG. 2.   FIG. 3.
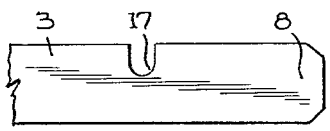   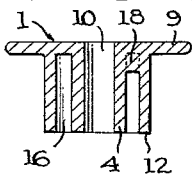
FIG. 4.
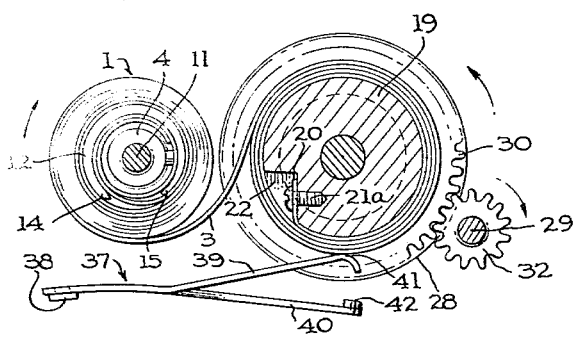
FIG. 5.
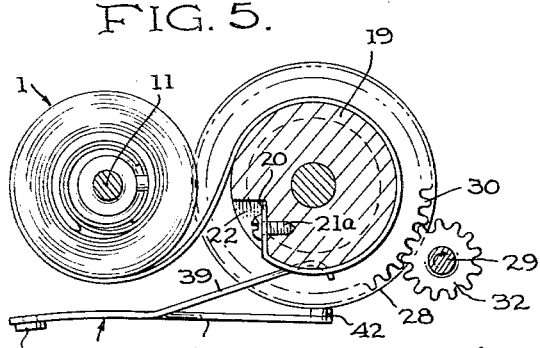
INVENTOR
RILEY LOHR
BY Emory L. Groff Jr.
ATTORNEY Nov. 9, 1965    R. LOHR    3,216,528
SPRING MOTOR DRIVE
Filed Dec. 23, 1963    2 Sheets-Sheet 2

INVENTOR
RILEY LOHR
BY Emory L. Groff Jr.
ATTORNEY

United States Patent Office 3,216,528
Patented Nov. 9, 1965

3,216,528
SPRING MOTOR DRIVE
Riley Lohr, Manheim, Pa., assignor to John H.
Hartman, Jr., Strasburg, Pa.
Filed Dec. 23, 1963, Ser. No. 332,977
2 Claims. (Cl. 185—37)

This invention relates to spring motor drives and more particularly to a motor of this class employing a prestressed spring and including means in the system for providing free-wheeling of at least one element upon termination of the retraction of the prestressed spring, for the purpose of utilizing the inertia accumulated in the system during the retraction to obtain maximum power.

Spring motor drives according to the present invention find common use in several fields including the toy industry. The use of a constant force prestressed spring is not new in itself and it will be understood that the present invention resides in the novel means set forth for providing for free-wheeling or overriding of a portion of the drive system which may be used in any of several types of devices.

This invention is an improvement relating to the spring motor drive set forth in applicant's copending application Ser. No. 310,690, filed on September 23, 1963. In the referenced application, free-wheeling is obtained by providing means for disconnecting the free end of the prestressed spring from the power transmitting drum at the end of the retraction of the spring back upon a storage reel such that the power drum may continue rotating until the inertia stored therein is fully expended.

The present invention comprises a unique motor drive system including positive mechanical braking means to halt the rotation of the power drum just short of the completed retraction of the prestressed spring, together with clutch means permitting continued rotation of a drive shaft.

A modification is also included wherein the free end of the prestressed spring is provided with a preformed loop portion, the inner diameter of which is slightly less than the outer diameter of the power drum. By this means, when the spring has been retracted to the point of the preformed loop, the loop will be expanded due to rotation of the drum surface and will become loose thereupon so as to slidably engage said drum with minimum frictional contact, thereby permitting continued rotation of the drum until its inertial force is expended.

Accordingly, one of the primary objects of this invention is to provide a constant force spring motor drive system comprising a prestressed spring and including means providing for free-wheeling of the drive means upon expenditure of the direct driving force of the spring.

Another object of this invention is to provide a spring motor drive including a brake mechanism automatically actuated by the retraction of a prestressed spring to halt the rotation of a power drum to permit rotation of a clutch-equipped drive shaft.

A further object of this invention is to provide a spring motor drive including a prestressed spring having a preformed loop at its free end adapted to frictionally engage a power drum when the drum is rotated in one direction and to become disengaged from the power drum when the drum is rotated in the opposite drum.

Still another object of the invention is to provide a spring motor drive, including a prestressed spring attached to a storage spool at one end and having means on the other end to arrest movement of the spring just short of complete retraction upon said spool.

With these and other objects in view which will more readily appear as the nature of the invention is better understood, the invention consists in the novel construction, combination and arrangement of parts hereinafter more fully described, illustrated and claimed.

A preferred and practical embodiment of the invention is shown in the accompanying drawings in which:

FIGURE 1 is a side elevation partly in section illustrating a known form of construction providing for free wheeling of the power drum and automatic pick-up of the free end of the prestressed spring.

FIGURE 2 is a partial top plan view of the anchored end of the prestressed spring and illustrates known means for retaining this end of the spring within the hub of the storage spool.

FIGURE 3 is a transverse sectional view of a known form of spring storage spool, illustrating the hub structure permitting of attachment of the end of the spring shown in FIGURE 2.

FIGURE 4 is a side, elevational view partly in section disclosing one form of the present invention including positive brake and clutch mechanism and illustrates the spring motor drive system during the retraction of the prestressed spring from the power drum to the storage spool.

FIGURE 5 is an elevational view similar to FIGURE 4 but illustrates the brake and clutch mechanisms in operation at the end of the retraction of the prestressed spring upon the storage spool.

Similar reference characters designate corresponding parts throughout the several views of the drawings.

Figure 6:
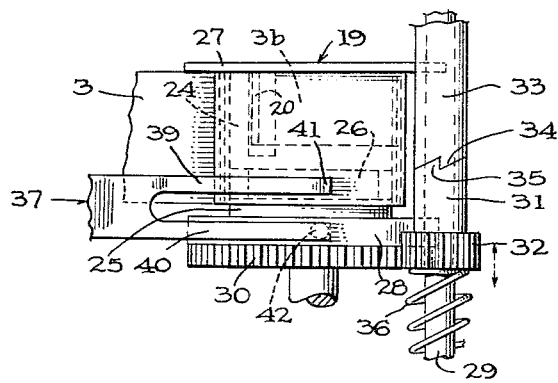
FIGURE 6 is a partial bottom plan view based on the apparatus as shown in FIGURE 4.

Referring now to the drawings, FIGURE 1 will be seen to illustrate a previously known form of free-wheeling means in a spring motor drive and comprises a spring storage spool generally designated 1 and a power drum 2. In utilizing the apparatus, a prestressed spring 3 such of the type as manufactured by Hunter Spring Corporation under the name "Neg'ator" spring, is permanently attached by any suitable means to the hub of the storage spool and is S-shaped or reversely bent around the periphery of the power drum 2. In this form automatic free-wheeling is achieved by providing the periphery of the drum 2 with a longitudinal notch 5 for receiving a hooked portion 6 on the free end of the spring 3. A ramp 7 leading out from one edge of the notch 5 causes the hook 6 of the spring to become disengaged from the notch at the end of the retraction of the spring upon the spool 1 to permit free-wheeling of the drum 2. The S-shaped free end of the spring is automatically picked up during winding of the power drum 2 since the hooked end of the spring is permanently set to bear upon the periphery of the drum and the notch 5 will be seen to pick up the hook portion 6 as the drum is rotated in the direction of the arrow in FIG. 1.

FIGS. 2 and 3 set forth details of the structure of suitable means for retaining the anchored end 8 of the spring within the confines of the hub 4 of the spool. This type of spool is manufactured by Hunter Spring Corporation and may be used with all forms of the present invention although any other suitable anchoring means may be used. As shown in FIGS. 1 and 3, the spool hub comprises two sections, namely, the primary hub 4, having a continuous periphery and having its center axis coinciding with the center of the spool flange 9. The bore 10 through this hub is adapted to receive any suitable supporting means such as a shaft 11. Such shaft 11 may form a slidable fit within the bore 10 or, if fixedly attached to the spool 1, may itself be rotatably mounted by any well-known means so that the spool will at all times be free to rotate. Concentrically disposed around the primary hub 4 is a secondary hub 12 which, as will be most clearly seen in FIGURE 1, is of varying thickness and is provided with an access or cut-out portion 13 for receiving the anchored end 8 of the spring 3. One edge 14 of the secondary hub 12 is thicker than the other edge 15 for reasons which will become readily apparent immediately hereinafter. The difference between the thickness of the two edges 14 and 15 is approximately equal to one thickness of the spring 3 so that when the anchored end of the spring 8 is secured between the secondary and primary hubs 12 and 4, there will be no noticeable bulging in the subsequent windings of the spring 3 around the secondary hub 12. As will be seen in FIGURES 1 and 3, the anchored end of the spring 8 is passed through the access portion 13 into the space 16 between the two hubs and is retained therebetween by means of a notch 17 along one side of the end 8 of the spring, which notch straddles a mating projection 18 disposed in the bottom of the space 16.

From the foregoing description, it will be seen that means have been provided for insuring that the subsequent windings of the spring 3 around the outside of the secondary hub 12 will all be substantially concentrically disposed with respect to the center axis of the spool bore 10 or its supporting shaft 11 so that during winding and unwinding of the spring there will be no uneven or wobbling action imparted to the spring due to eccentric convolutions of the spring upon the spool 1.

FIGURES 4-8 disclose one embodiment of the present invention for providing means other than that as shown in FIGURE 1 for permitting free-wheeling in a spring motor drive system. It will be understood that the spring storage spool and its anchoring means, as described above in connection with FIGURES 1-3, is the preferred means used in connection with this embodiment for retaining the anchored end 8 of the spring 3.

In this form the free end of the spring 3, which previously was provided with hook means for automatically engaging and disengaging the periphery of the power drum 2, is now permanently attached to the power drum designated 19. The end of the spring is bent to form a tab 20 and is provided with a fastener receiving opening 21, as most clearly illustrated in FIGURE 8. Suitable attaching means, such as a screw fastener 21a, is utilized to fixedly attach the tab 20 within a notch 22 formed in the periphery of the power drum 19, as seen in FIGURES 4 and 5. The end of the spring 3 adjacent the tab 20 is formed with a cut away portion 38 having an offset shoulder 23. It will be understood that the narrow width portion 3b of the spring 3 between the shoulder 23 and tab 20 is substantially less than the width of the balance of the spring for reasons which will become obvious hereinafter.

Figure 7:
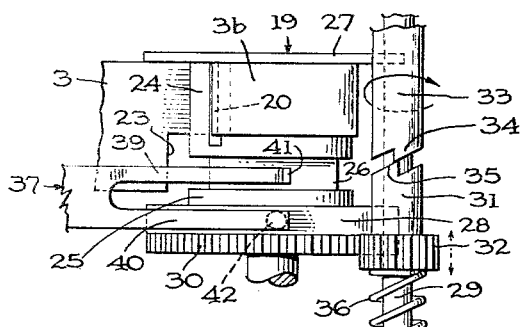
FIGURE 7 is a partial bottom plan view based on the apparatus as shown in FIGURE 5.
Figure 8:
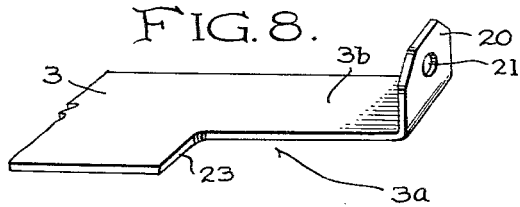
FIGURE 8 is a partial perspective view of the end of the prestressed spring as used in the device illustrated in FIGURES 4–7.

As shown in FIGURES 6 and 7, the periphery of the drum 19 is formed in two segments 24 and 25 having equal diameters and spaced from each other by a reduced diameter portion therebetween in the form of a peripheral recess or groove 26. One end of the drum may be provided with a flange 27 for guiding and retaining the edge of the spring 3 on the drum while the opposite end of the drum is also provided with a flange 28, which latter flange will be referred to as a brake flange and is preferably wider than the former flange 27. Suitable means are included for transmitting the driving force from the rotating power drum 19 to a drive shaft 29 located adjacent the periphery of the power drum for utilizing the spring power in whatever device is being powered. In this instance, the means are shown as a drum gear 30 concentrically mounted adjacent the brake flange 28. Slidably mounted on the drive shaft 29 is a ratchet sleeve 31 including a drive pinion 32 meshing with the drum gear 30. Also mounted on the drive shaft 29 is another ratchet sleeve 33 which is fixedly attached to the drive shaft. One end of the ratchet sleeve 33 is provided with suitable one-way clutch means such as ratchet teeth 34 which cooperate with mating ratchet teeth 35 on the opposed end of the sliding ratchet sleeve 31. By means of a spring 36 which constantly bears against the outer face of the pinion 32, it will be seen that the sliding ratchet and pinion assembly 31-32 will be constantly urged toward engagement with the fixedly attached ratchet sleeve 33.

Since the width of the gear teeth on the drive pinion 32 is substantially greater than the width of the teeth on the drum gear 30, it will follow that the sliding ratchet and pinion 31-32 may be moved axially a substantial distance while contact is still maintained between the teeth of the two geared elements.

Any suitable means may be used to wind the prestressed spring upon the power drum 19 in order to prepare the device in which the spring motor drive system is mounted for use. When the power drum having the prestressed spring mounted thereupon is released, the prestressed spring which has been reversely wound upon the drum from the storage spool 1 will be under tension to return to the storage spool and in so doing, will cause rotation of the power drum gear and drive pinion in the direction shown by the arrows in FIGURE 4. Because of spring 36, the pinion 32 will be urged to the position as shown in FIGURE 6 wherein it will be seen that the ratchet teeth 34 and 35 are locked in engagement in such a manner as to transmit rotative motion from the drum 30 to the drive shaft 29.

In order to prevent an abrupt halt to the power drum and also possible damage to the attached end of the spring, a brake mechanism generally designated 37 is utilized to slow down the rotation of the power drum before the spring 3 has been completely unwound or retracted from the power drum back onto the storage spool 1, thereby permitting free wheeling of the drive shaft 29 due to the action of the one-way clutch or ratchet teeth 34 and 35, previously described.

The brake mechanism 37 comprises a flexible element, preferably spring-steel, which is anchored by any suitable means at one end 38 thereof so that the other, or free end, is urged towards contact with the power drum. The opposite or free end of the brake mechanism is forked to provide on the one hand a follower arm 39 and on the other hand a brake arm 40. The brake mechanism is disposed so that the free ends of the follower arm 39 and brake arm 40 are positioned opposite the peripheral groove or recess 26 and the brake flange 28, respectively. The follower arm is bent out of the plane of the brake arm so that when the contact end 41 of the follower arm is forced out of the groove 26, as will be described hereinafter, the contact end 42 of the brake arm will be removed from the periphery of the brake flange 28.

Referring now particularly to FIGURES 4 and 6, it will be seen that as long as there are one or more turns of the spring 3 wound upon the periphery of the drum 19 that the convolutions of the spring will engage the end contact portion 41 of the follower arm 39 to deflect the brake mechanism away from the power drum against its inherent resilient action. In this manner the brake arm 40 which forms an integral part of the brake mechanism will likewise be lifted or forced away from the periphery of the brake flange 28. On the other hand, when the spring has just about become unwound from the brake drum 19 and returned to the storage spool 1, it will be seen that as soon as the off-set shoulder portion 23 of the spring has passed from the point between the end 41 of the follower arm and the peripheral groove 26 that the follower arm will be resiliently urged into this peripheral groove. This action then causes the contact end 42 of the brake arm to be urged against the periphery of the brake flange 28 to stop rotation of the drum 19. At this point the structure will appear as that illustrated in FIGURES 5 and 7 wherein it will be understood that the spool 1 and drum 19 are stationary while the drive shaft 29 still continues to rotate due to the ratchet mechanism included thereon until the inertial force built up in the device being powered has been expended.

After the spring 3 has been retracted from the drum to the spool and it is desired to prepare the motor for another power cycle, the spring is again wound from the spool to the drum as previously described. As this is done, the off-set portion 23 of the spring will bridge the groove 26 and as the off-set edge is rotated around to the point where the follower arm contact 41 is disposed within the groove, it will be understood that the arm 39 is lifted out of the groove and rides on the periphery of the outermost convolution. The brake mechanism will then appear as in FIGURES 4 and 6.

Figure 9:
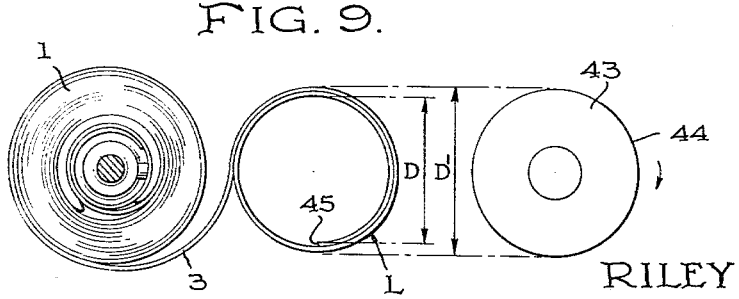
FIGURE 9 is an exploded side elevational view partly in section illustrating a modification of the invention.

FIGURE 9 discloses another embodiment wherein the free end of the spring 3 is formed in a novel manner to cooperate with the periphery of a drum 43 having a continuous outer surface 44. That is, the peripheral surface 44 is not provided with a groove or with a longitudinal notch as previously disclosed.

In this modification the free end of the prestressed spring is reversely wound upon itself to form a self-sustaining loop, comprising at least 1½ convolutions of the spring. The end of the spring as thus coiled is set so that a permanent preformed loop is provided. An important feature in this form is that the inside diameter D of this preformed loop is slightly less than the outer diameter D' of the periphery 44 of the drum. To further enhance the effectiveness of this form the periphery 44 of the drum is preferably provided with a slightly roughened surface or at least constructed of a material which creates sufficient friction with the material of the spring loop to enable satisfactory operation of the device as will be described.

With the preformed loop positioned around the periphery 44 of the drum, it will be noted that the loop must necessarily be expanded slightly against its inherent coiling tension to enlarge the diameter D to at least the diameter D' to enable installation of the loop around the drum 43. With the loop at rest in position upon the drum 43 a slight tension is exerted against the surface 44 due to the differences in the diameters D and D'. As the drum 43 is rotated in the direction of the arrow to wind the spring from the spool 1 upon the drum, the surface 44 of the periphery 44 readily picks up the free end 45 of the preformed loop and creates a binding of the inner convolution of the spring loop upon the drum so that a secure anchoring is obtained during the winding of the spring from the spool to the drum. Obviously, as the drum is further rotated, the pulling force tends to pull the end turns of the spring down to a smaller diameter and increases the binding force of the spring on the drum. During the power stroke, that is, when the wound drum is released and the spring is drawn back upon the spool 1, free-wheeling or slipping of the drum 43 is achieved when the spring has returned to the position shown in FIGURE 9 since rotation of the periphery 44 in a counter-clockwise direction causes the drum surface to frictionally engage the free end 45 of the spring or well as the inner surface of the innermost convolution of the loop so as to slightly enlarge the diameter D of the loop. As long as the drum 43 continues to free-wheel under the influence of the inertia built up therein, during the retraction of the spring, it will be understood that this very free-wheeling maintains the diameter of the preformed loop, at least as great as the diameter of the drum surface 44.

I claim:

1. In a spring motor drive system having a rotatably mounted spool adapted to house a retractable prestressed spring, a rotatable power drum mounted adjacent said spool, said spring attached at one end to said spool and including means on the other end for anchoring to said drum when said spring is wound thereupon, said spring reversely wound upon itself in passing from said spool to said drum to provide an S-shaped curve whereby drive energy will be stored upon said drum when said spring is wound thereupon, said anchoring means comprising a pre-formed loop in said reversely wound spring including a full circle and which when free-standing away from said drum has a normal inner diameter less than the outer diameter of said drum so that when disposed about said drum engages the drum of its own accord as said spring is wound upon said drum, and free-wheeling means including a rotatable shaft driven by said drum and providing continued rotary movement of said shaft after retraction of said spring from said drum to said spool due to rotation of said drum which causes said pre-formed loop to increase its diameter and thereby release its engagement with said drum.

2. A spring motor drive system, according to claim 1, wherein said preformed loop includes a minimum of one and one-half convolutions of said spring.

References Cited by the Examiner

UNITED STATES PATENTS

| 2,835,344 | 5/58 | Allen | 185—37 |
| 2,899,193 | 8/59 | Foster | 185—37 |
| 2,960,297 | 11/60 | Cotter et al. | 185—37 X |

FOREIGN PATENTS

| 755,142 | 8/56 | Great Britain. |

MARK NEWMAN, *Primary Examiner.*

JULIUS E. WEST, *Examiner.*